US006501883B1

(12) United States Patent
Painchaud et al.

(10) Patent No.: US 6,501,883 B1
(45) Date of Patent: Dec. 31, 2002

(54) METHOD AND APPARATUS FOR RECORDING AN OPTICAL GRATING IN A PHOTOSENSITIVE MEDIUM

(75) Inventors: Yves Painchaud, Sillery (CA); Alain Mailloux, Québec (CA); Hélène Chotard, Québec (CA)

(73) Assignee: Teraxion Inc., Quebec (CA)

( * ) Notice: Subject to any disclaimer, the term of this patent is extended or adjusted under 35 U.S.C. 154(b) by 0 days.

(21) Appl. No.: 10/101,522

(22) Filed: Mar. 18, 2002

(30) Foreign Application Priority Data

Oct. 9, 2001 (CA) .............................................. 2358659

(51) Int. Cl.[7] .......................... G02B 6/00; G02B 6/34; G02B 6/12; H01L 31/18
(52) U.S. Cl. ............................ 385/37; 385/14; 359/566
(58) Field of Search .............................. 385/37, 123, 10, 385/8, 14, 129, 130, 147; 235/458; 359/566, 570, 4, 18, 900, 569, 573; 437/4, 51

(56) References Cited

U.S. PATENT DOCUMENTS

| 3,587,063 A | * | 6/1971 | Lamberts et al. ............ 235/458 |
| 4,747,646 A | * | 5/1988 | Andrews ...................... 359/18 |
| 5,327,515 A | | 7/1994 | Anderson et al. ............ 385/123 |
| 5,351,321 A | | 9/1994 | Snitzer et al. ................. 385/10 |
| 5,367,588 A | | 11/1994 | Hill et al. ....................... 385/37 |
| 5,719,690 A | * | 2/1998 | Burland et al. ................. 359/4 |
| 5,903,689 A | | 5/1999 | Painchaud et al. ............ 385/37 |
| 6,072,926 A | | 6/2000 | Cole et al. ..................... 385/37 |

OTHER PUBLICATIONS

K.O. Hill, B. Malo, F. Bilodeau, D.C. Johnson, and J. Albert, "Bragg gratings fabricated in monomode photosensitive optical fiber by UV exposure through a phase mask", Appl. Phys. Lett. pp. 1035–1037 (1993).

D.Z. Anderson, V. Mizrahi, T. Erdogan and A.E. White, "Production of in–fibre gratings using a diffractive optical element", Electron. Lett. pp. 566–568 (1993).

J. Martin and F. Ouellette, "novel writing technique of long and highly reflective in–fibre gratings," Electron. Lett. pp. 911–812 (1994).

M.J. Cole, W.H. Loh, R.I.Laming, M.N. Zervas and S. Barcelos, Moving fibre/phase mask–scanning beam technique for enhanced flexibility in producing fibre gratings with uniform phase mask, Electron. Lett. pp. 1488–1490 (1995).

K.C. Byron and H.N. Rourke, "Fabrication of chirped fibre gratings by novel stretch and write technique", Electron. Lett.pp. 60–61 (1995).

K. Sugden, I. Bennion, A. Molony, and N.J. Copner, "Chirped gratings produced in photosensitive optical fibres by fibre deformation during exposure", Electron. Lett. pp. 440–442 (1994).

Y. Painchaud, A. Chandonnet, and J. Lauzon "Chirped fibre gratings produced by tilting the fibre", Electron. Lett. pp. 171–172 (1995).

J.D. Prohaska, E. Snitzer, S. Rishton, and V. Boegli "Magnification of mask fabricated fibre Bragg gratings", Electron. Lett. pp. 1614–1615 (1993).

A.V. Buryak and Dmitrii Yu. Stepanov, "Novel multi–channel grating designs" in technical digest of Bragg gratings photosensitivity and poling in glass waveguides, Jul. 4–6, 2001, Stresa, Italy.

* cited by examiner

*Primary Examiner*—Akm E. Ullah
(74) *Attorney, Agent, or Firm*—Darby & Darby

(57) ABSTRACT

A method and an apparatus for recording optical gratings in a photosensitive medium are provided. The invention uses a phase mask in combination with a scanning of the recording light beam. The phase mask, or alternatively the photosensitive medium, is translated along a direction parallel to the scanning of the light beam, so that the period of the recorded grating may be locally adjusted. To ensure a proper recording efficiency over a large range, an appropriately selected wavefront curvature is provided in the light beam. The method of the invention is particularly advantageous for the recording of superimposed grating components in a photosensitive medium.

27 Claims, 4 Drawing Sheets

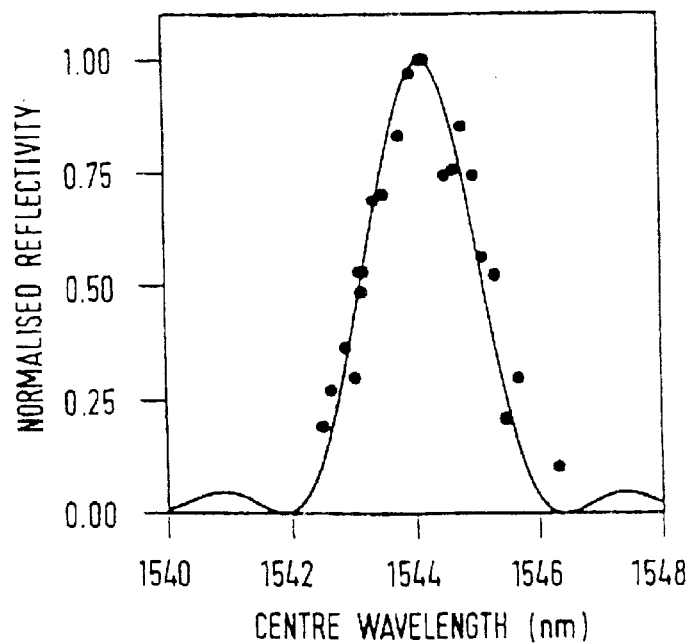
FIG. 1
(PRIOR ART)
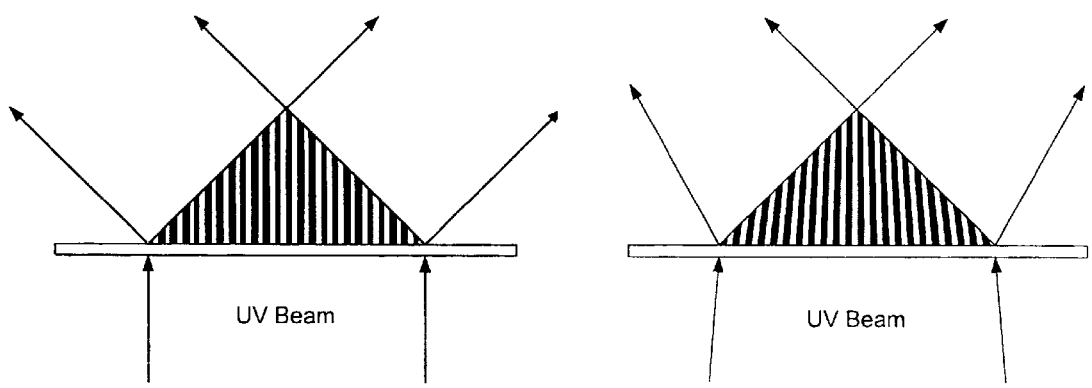
FIG. 2A
(PRIOR ART)
FIG. 2B
(PRIOR ART)

METHOD AND APPARATUS FOR RECORDING AN OPTICAL GRATING IN A PHOTOSENSITIVE MEDIUM

FIELD OF THE INVENTION

The present invention relates to the field of components for optical telecommunications and more particularly concerns a method and a corresponding apparatus for recording optical gratings in a photosensitive medium with an enhanced control of the characteristics of the grating.

BACKGROUND OF THE INVENTION

Phase masks are widely used for the fabrication of UV-induced fiber Bragg gratings since their first reports (see for example K. O. Hill, B. Malo, F. Bilodeau, D. C. Johnson, and J. Albert, "*Bragg gratings fabricated in monomode photosensitive optical fiber by UV exposure through a phase mask*" Appl. Phys. Lett., pp.1035–1037 (1993); U.S. Pat. No. 5,367,588 (Hill et al.); D. Z. Anderson, V. Mizrahi, T. Erdogan, and A. E. White, "*Production of in-fibre gratings using a diffractive optical element*" Electron. Lett., pp.566–568 (1993); and U.S. Pat. No. 5,327,515 (Anderson et al.). The use of such a diffractive element renders easy the mass production of fiber Bragg gratings as the mask acts somewhat as a master replicated onto a large number of fiber Bragg gratings. However, a typical writing setup with a phase mask is not flexible and allows the fabrication of only one type of fiber Bragg gratings, that is, the one with the specifications prescribed by the phase mask.

The fiber is characterized by an effective index $n_{eff}$ that is modified by the UV radiation. A fiber Bragg grating is mainly characterized by the period p of the index modulation in the core of the fiber, along its axis. The fiber Bragg grating reflects light having a wavelength $\lambda_B$ (the Bragg wavelength) given by:

$$\lambda_B(z) = 2p(z)\tilde{n}_{eff}(z), \qquad (1)$$

Where $\tilde{n}_{eff}$ is the slowly varying effective index of the fiber inside the grating, z is the position along the grating and the dependence of the parameters over z indicates that both the period and the slowly varying effective index are not necessarily uniform along the grating. There is an interest in the control of the Bragg wavelength along a grating. This can be done by controlling the period of the grating along the fiber.

Translating a UV-beam along the phase mask is a convenient way to achieve long gratings (J. Martin, and F. Ouellette, "*Novel writing technique of long and highly reflective in-fibre gratings*" Electron. Lett., pp.911–812 (1994)). In particular, it allows a fine control of the apodisation, that is the strength of the grating, along the fiber axis.

Several techniques based on a phase mask but with enhanced flexibility have been proposed over the past few years. One of the most straightforward way to modify the grating period is by stretching the fiber, such as taught in K. C. Byron, and H. N. Rourke, "*Fabrication of chirped fibre gratings by novel stretch and write technique*" Electron. Lett., pp.60–61 (1995) and K. Sugden, I. Bennion, A. Molony, and N. J. Copner, "*Chirped gratings produced in photosensitive optical fibres by fibre deformation during exposure*" Electron. Lett., pp.440–442 (1994). There is also suggested in Y. Painchaud, A. Chandonnet, and J. Lauzon, "*Chirped fibre gratings produced by tilting the fibre*" Electron. Lett., pp.171–172 (1995) and U.S. Pat. No. 5,903,689 (PAINCHAUD et al.) to adjust the period by controlling the angles of both the phase mask and the fiber with respect to the UV-beam axis.

Referring to U.S. Pat. No. 6,072,926 (COLE et al.) and M. J. Cole, W. H. Loh, R. I. Laming, M. N. Zervas, and S. Barcelos, "*Moving fibre/phase mask-scanning beam technique for enhanced flexibility in producing fibre gratings with uniform phase mask*" Electron. Lett., pp.1488–1490 (1995), it is known to adjust the period by moving the phase mask. For the fine tuning of the Bragg wavelength, Cole proposed a lateral displacement of the phase mask during a writing process involving a scan of the UV beam. Excellent results have been obtained but the adjustment range is limited to about 1 nm. FIG. 1 (PRIOR ART) shows the limit of the grating period adjustment when the UV beam diameter is 350 μm: the reflectivity decreases as a function of the detuning which corresponds to a decrease in the writing efficiency. The adjustment range increases as the UV beam size decreases. Cole also proposed a displacement of the phase mask at variable velocity for the adjustment of a chirp in the grating period.

On another hand, Prohaska, described in U.S. Pat. No. 5,351,321 (SNITZER) and J. D. Prohaska, E. Snitzer, S. Rishton, and V. Boegli, "*Magnification of mask fabricated fibre Bragg gratings*" Electron. Lett., pp.1614–1615 (1993) a technique for controlling the period of a Bragg grating over a large range (several nanometers) by using a magnifying lens along the UV beam axis. The right side of FIG. 2 (PRIOR ART) shows the interference fringes at the output of a phase mask when a convergent UV beam is incident at the input surface. By placing a fiber at a distance q from the output surface of the phase mask, a grating will be photoimprinted having a period p given by:

$$p = \Lambda/2 \cdot M, \qquad (2)$$

where $$M = 1 - \frac{q}{z_f}, \qquad (3)$$

is the magnification factor, $\Lambda$ is the phase mask period, q is the distance between the output surface of the phase mask and the fiber core and $z_f$ is the distance between the output surface of the phase mask and the focal plane, that is the plane where the beam would be focalized. The distance $z_f$ also corresponds to the radius of curvature of the wavefront at the phase mask.

Oppositely, the left side of FIG. 2 (PRIOR ART) illustrates the interference fringes at the output of a phase mask when a collimated beam is incident. In this case, the period of the grating is independent of the distance between the phase mask and the fiber.

The technique described by Prohaska allows an adjustment of the Bragg wavelength over a large range (several nanometers). However, the optical characteristics of the resulting grating are degraded: the photo-induced grating is slanted (blazed) in a spatially-dependent manner. Such a slanted fringes inside the grating causes a spatial dependence of the diffraction efficiency and increases significantly the polarization dependent loss and polarization mode dispersion. Another drawback is the need for uncommonly large lenses when a long grating is to be photo-induced, making the method more costly and unpractical.

There is therefore a need for a fabrication techniques for Bragg gratings or the like alleviating the above mentioned drawbacks of the prior art.

OBJECTS AND SUMMARY OF THE INVENTION

Accordingly, it is an object of the present invention to provide a method of recording optical gratings in a photosensitive medium that is versatile and commercially practical.

It is another object of the present invention to provide an apparatus adapted to carry out such a method.

It is a preferable object of the invention to provide such a method that enables the recording of long gratings over a large wavelength range.

It is another preferable object of the invention to provide a method and apparatus for recording superimposed grating components in a photosensitive medium.

Accordingly, the present invention provides a method for recording an optical grating along a waveguiding axis in a photosensitive medium. The method includes:

a) providing a phase mask proximate the photosensitive medium along the waveguiding axis;

b) projecting a light beam through a portion of the phase mask to generate a light beam with a modulated intensity profile. The light beam with a modulated intensity profile impinges on the photosensitive medium to locally record therein a portion of the optical grating, having a characteristic period;

c) moving the light beam along the waveguiding axis of the photosensitive medium to successively record portions of the optical grating therealong; and d) concurrently to the moving of the light beam:
i) moving the phase mask in a direction parallel to the moving of the light beam. The moving of the phase mask is adjusted relative to the moving of the light beam to locally tune the characteristic period of each portion of the optical grating; and
ii) providing a curvature in the light beam wavefront along the direction of the waveguiding axis, this curvature having a wavefront radius of curvature at a phase mask plane selected to generally optimize an efficiency of the recording of the optical grating for this characteristic period.

In the alternative, the present invention provides another method for recording an optical grating along a waveguiding axis in a photosensitive medium, the method comprising:

a) providing a phase mask proximate to the photosensitive medium along the waveguiding axis;

b) projecting a light beam through a portion of said phase mask to generate a light beam with a modulated intensity profile, said light beam with a modulated intensity profile impinging on the photosensitive medium to locally record therein a portion of the optical grating having a characteristic period;

c) moving the light beam along the waveguiding axis of the photosensitive medium to successively record portions of the optical grating therealong; and d) concurrently to said moving of the light beam:
i) moving the photosensitive medium in a direction parallel to the moving of the light beam, said moving of the photosensitive medium being adjusted relative to the moving of the light beam to locally tune the characteristic period of each portion of the optical grating; and
ii) providing a wavefront curvature in said light beam along the direction of the waveguiding axis, said curvature having a wavefront radius of curvature in a plane of the phase mask selected to generally optimize an efficiency of the recording of the optical grating for said characteristic period.

In accordance with another aspect of the invention, there is also provided an apparatus for recording an optical grating along a waveguiding axis in a photosensitive medium. The apparatus includes a phase mask provided proximate the photosensitive medium along the waveguiding axis. A light source is also provided, generating a light beam for projection through a portion of the phase mask to generate a light beam with a modulated intensity profile. The light beam with a modulated intensity profile impinges on the photosensitive medium to locally record therein a portion of the optical grating having a characteristic period.

Light beam moving means are provided for moving the light beam along the waveguiding axis of the photosensitive medium to successively record portions of the optical grating therealong, and phase mask moving means are also included for moving the phase mask in a direction parallel to the moving of the light beam and concurrently thereto. The moving of the phase mask is adjusted relative to the moving of the light beam to locally tune the characteristic period of each portion of the optical grating.

The apparatus finally includes curvature means for providing a curvature in the light beam along the direction of the waveguiding axis. The curvature has a wavefront radius of curvature in a plane of the phase mask selected to generally optimize an efficiency of the recording of the optical grating for the characteristic period of each portion of the optical grating.

Finally, in accordance with a preferred embodiment of the invention, there is provided a method for recording an optical grating along a waveguiding axis in a photosensitive medium, the optical grating comprising a plurality of superimposed grating components each having a characteristic period profile, the method comprising:

a) providing a phase mask proximate the photosensitive medium along the waveguiding axis;

b) for each of the superimposed grating component:
i) projecting a light beam through a portion of said phase mask to generate a light beam with a modulated intensity profile, said light beam with a modulated intensity profile impinging on the photosensitive medium to locally record therein a portion of the optical grating component having a characteristic period;
ii) moving the light beam along the waveguiding axis of the photosensitive medium to successively record portions of the optical grating component therealong; and
iii) concurrently to said moving of the light beam:
1) moving the phase mask in a direction parallel to the moving of the light beam, said moving of the phase mask being adjusted relative to the moving of the light beam to locally tune the characteristic period of each portion of the optical grating component; and
2) providing a curvature in said light beam along the direction of the waveguiding axis, said curvature having a wavefront radius of curvature in a plane of the phase mask selected to generally optimize an efficiency of the recording of the optical grating for said characteristic period.

Advantageously, the present invention allows to locally control the period of an optical grating over a large range (about ±2% of the nominal period) while keeping the optical quality of the grating unaffected. Other techniques have been proposed but result in a degradation of the optical performances.

Other aspects and advantages of the present invention will be better understood upon reading a preferred embodiments thereof with reference to the appended drawings.

BRIEF DESCRIPTION OF THE DRAWINGS

FIG. 1 (PRIOR ART) shows the reflectivity as a function of wavelength for an optical grating made using the technique described by Cole et al.

FIGS. 2A and 2B (PRIOR ART) illustrate the interference fringes at the output of a phase mask when the incident light beam is collimated (FIG. 2A) and convergent (FIG. 2B).

DESCRIPTION OF PREFERRED EMBODIMENTS OF THE INVENTION

Figure 3:
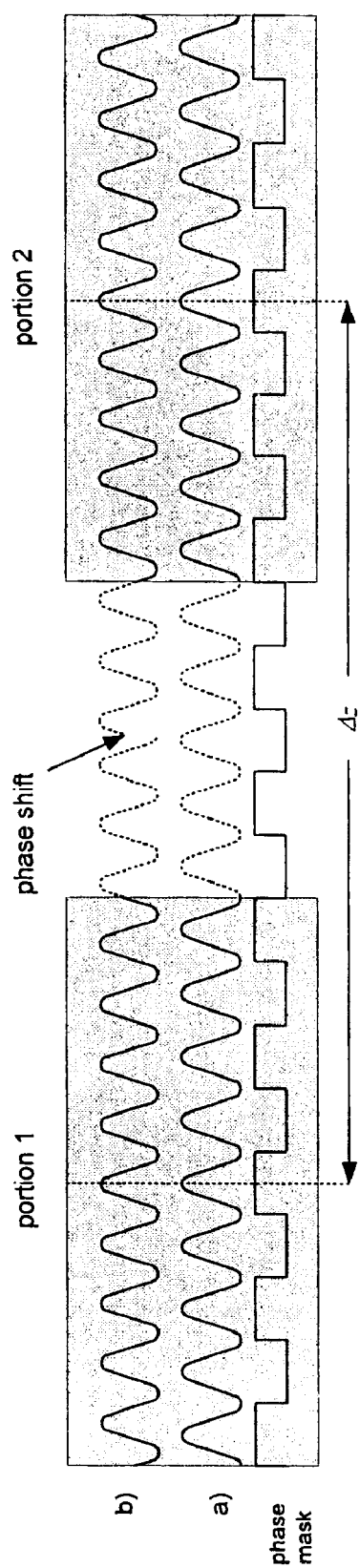
FIG. 3 illustrate the index modulation in two successive portions of a photosensitive medium when the light beam is convergent and when the light beam has a curvature.

The present invention advantageously allows to improve the range of the phase mask moving technique disclosed by Cole et al. where the phase mask (or photosensitive medium) is displaced parallel to the scanning of the light beam.

In accordance with a first preferred embodiment of the invention, there is provided a method for recording an optical grating along a waveguiding axis in a photosensitive medium. Preferably, the photosensitive medium is a length of optical fiber, but any other type of waveguide where a refractive index grating needs to be written would be equally covered by the present invention. The expression "optical grating" refers generally to a periodic (or nearly periodic) refractive index change in an optical medium. It can be of any length allowed by the geometry of the system, and if desired it may be chirped, apodised, etc.

The method first involves providing a phase mask proximate the photosensitive medium, along its waveguiding axis. The phase mask preferably has a constant period along its length but a chirped mask could also be used, with appropriate modifications to the other parameters of the system. By the expression "proximate the photosensitive medium" it is meant that the photosensitive medium is positioned within the diffraction field of a light beam modulated by the phase mask. Preferably, the phase mask extends in parallel to the waveguiding axis of the photosensitive medium, but the two could alternatively form a small angle to induce a chirp in the photoinduced optical grating.

The next step of the method of the present invention involves projecting a light beam through a portion of the phase mask, to generate a light beam with a modulated intensity profile. The light beam with a modulated intensity profile impinges on the photosensitive medium to locally record therein a portion of the optical grating. This portion of the optical grating has a characteristic period p(z), z representing the position of this particular portion of the grating along the waveguiding axis. The light beam is preferably UV radiation produced by a laser.

The light beam is then moved along the waveguiding axis, to successively record portions of the optical grating therealong at different positions z. Concurrently to this movement of the light beam, the phase mask is also moved in a parallel direction, in accordance with the technique of Cole et al. The movement of the phase mask is adjusted relative to the moving of the light beam to locally tune the characteristic period of each portion of the optical grating which is being photoinduced in the photosensitive medium. A translation of the phase mask in the same direction as the movement of the light beam will increase the local characteristic period of the grating, whereas moving the two in opposite directions shortens the grating's period.

As explained above, the tunability of the grating period with the Cole et al. technique is limited by the range of the reflectivity peak seen on FIG. 1. To alleviate this drawback, the present invention provides a curvature in the light beam wavefront, and the wavefront radius of curvature at the phase mask plane is selected to generally optimize the efficiency of the recording of the optical grating for a given characteristic period. This essentially allows to a large wavelength shift in the efficiency curve of FIG. 1 to align the reflectivity peak with the desired wavelength.

The principle of the present invention may be understood by the following reasoning.

The use of a wavefront curvature in the light beam, that is making the light beam convergent or divergent, allows to modify the Bragg wavelength depending on the position of the photosensitive medium with respect to the phase mask, as illustrated in FIG. 2B. However, if the UV beam is translated during the writing process, a grating having a period p=Λ/2 will be obtained regardless of the wavefront radius of curvature. This is because the effect of the wavefront curvature is reduced to a loss of efficiency similar to the one obtained by a vibration of the phase mask. This can be understood as follow: an optical grating is to be written using a phase mask having N fringes over a length L. By scanning a light beam over the whole phase mask, the photosensitive medium will be illuminated over the same length L and will contain 2N fringes. The period of the resulting grating depends only on the phase mask characteristics and do not depend on the wavefront curvature of the scanned light beam.

However, If the phase mask is properly displaced during the scan of a light beam having a curvature in its wavefront, a Bragg wavelength adjustment can be obtained over a large range. The range of Bragg wavelength adjustment can be as large as the one obtained with the Prohaska technique, but without the adverse effects of slanted fringes.

FIGS. 3A and 3B illustrates the index modulation induced inside two portions of a photosensitive medium during a step-by-step scan. When the light beam is collimated (FIG. 3A), the phase in the index modulation is the same in the two portions. When the UV beam has a curvature in its wavefront (FIG. 3B), a phase shift exists between the two portions. This phase shift depends on the wavefront curvature, on the laser beam displacement and on the distance between the phase mask and the waveguiding axis of the photosensitive medium according to:

$$\theta = 2\pi \cdot \frac{2\Delta z}{\Lambda}\left(1 - \frac{1}{M}\right) \quad (4)$$

This phase shift between portions is however eliminated by properly coordinating the movements of the phase mask as the light beam. The required displacement $\Delta x_m$ of the phase mask for eliminating the phase shift is:

$$\Delta x_m = \Delta z\left(1 - \frac{1}{M}\right) \quad (5)$$

This displacement of the phase mask, in combination with the use of a wavefront curvature in the light beam therefore allows a strong increase in the adjustment range of the Bragg wavelength with respect to the technique disclosed by Cole et al.

In the method according to the present invention, it is the displacement of the phase mask which determines the period of the grating. The wavefront curvature of the light beam is then adjusted in order for the writing process to be efficient. The effect of the wavefront curvature can be viewed as a wavelength shift in the efficiency curve shown in FIG. 1. A disagreement between the phase mask displacement and the light beam wavefront curvature causes a loss of writing efficiency according to the graph shown in FIG. 1. Thus, the adjustment of the wavefront curvature is not extremely critical, as long as the resulting recording efficiency remains within the acceptable range.

In accordance with a first preferred embodiment of the invention, the moving of the light beam and of the phase mask are both done step by step. Therefore, between the recording of each consecutive grating portions the light beam undergoes a displacement $\Delta z$ and the phase mask is displaced by a quantity $\Delta x_m$. If, for a given grating portion, the nominal period of the optical grating $p_0$ (corresponding to a Bragg wavelength $\lambda_{B0}$) is the one obtained without any phase mask displacement, the period shift $\Delta p$ from this nominal value, and the corresponding shift in the Bragg wavelength of the grating portion, is given by:

$$\frac{\Delta p}{p_0} = \frac{n_g}{n_{eff}} \frac{\Delta \lambda_B}{\lambda_{B0}} = \frac{\Delta x_m}{\Delta z - \Delta x_m}, \quad (6)$$

where $n_g$ and $n_{eff}$ are the group and effective indices of the waveguiding axis respectively.

The required wavefront radius of curvature of the light beam at the phase mask plane for the writing to be efficient is:

$$z_f \approx q \cdot \frac{\Delta x_m - \Delta z}{\Delta x_m} \quad (7)$$

where q is the distance between the phase mask and the waveguiding axis of the photosensitive medium. The approximate nature of this relationship denotes the tolerance of the Cole technique as seen in FIG. 1. This radius of curvature corresponds to a magnification given by Equation (3).

According to a second preferred embodiment of the invention, the moving of the light beam and the phase mask may be done continuously. In such a continuous scanning process, in any point along the grating, the local value of the nominal grating period $p_0(z)$ (and Bragg wavelength $\lambda_{B0}(Z)$) is modified by a quantity $\Delta p(z)$ ($\Delta \lambda.B(z)$) by displacing the phase mask by a quantity $dx_m(z)$ according to:

$$\frac{\Delta p(z)}{p_0(z)} = \frac{n_g}{n_{eff}} \frac{\Delta \lambda_B(z)}{\lambda_{B0}(z)} = \frac{dx_m(z)}{dz - dx_m(z)} = \frac{v_m(z)}{v(z) - v_m(z)}, \quad (8)$$

where dz is the translation of the UV beam, $v_m(z)$ is the velocity of the phase mask at position z and $v(z)$ is the velocity of the light beam translation at position z. The wavefront radius of curvature must be such that at each point along the grating, the following relationship holds:

$$M(z) \approx 1 + \frac{dx_m(z)}{dz - dx_m(z)} = 1 + \frac{v_m(z)}{v(z) - v_m(z)}, \quad (9)$$

and therefore $z_f$ is adjusted so that:

$$z_f \approx q \cdot \frac{v_m(z) - v(z)}{v_m(z)}. \quad (10)$$

Advantageously, the method of the present invention allows to tailor the characteristic period profile of the recorded grating by simply controlling two parameters, that is the relative translation of the phase mask and light beam and the wavefront radius of curvature of the light beam. The present invention may also be combined with any other appropriate techniques that may further provide an adjustment of the characteristics of an optical grating, such as stretching the fiber, varying the scanning speed, etc.

In accordance with another embodiment of the present invention, the method above could be modified so that the photosensitive medium is moved instead of the phase mask, since the desired effect on the period depends on the relative displacement between these two components, It will be readily understood that to obtain the same effect, the photosensitive medium should be translated in the opposite direction as the phase mask would have been.

Figure 4A:
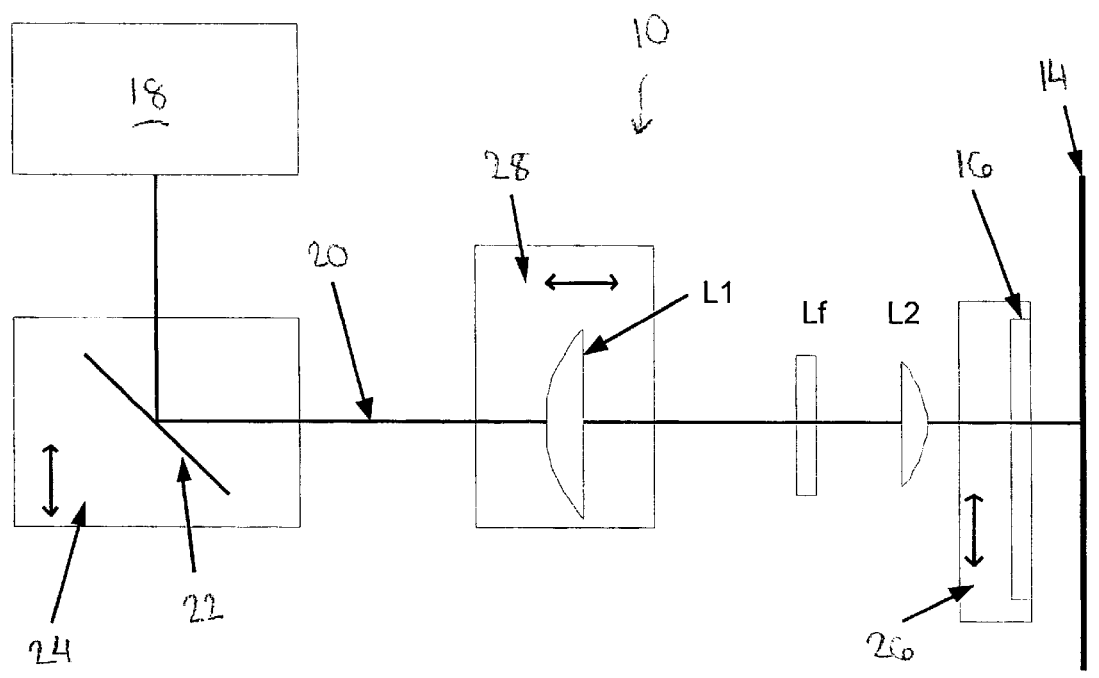
FIG. 4A is a side view of an apparatus according to a preferred embodiment of the invention.
Figure 4B:
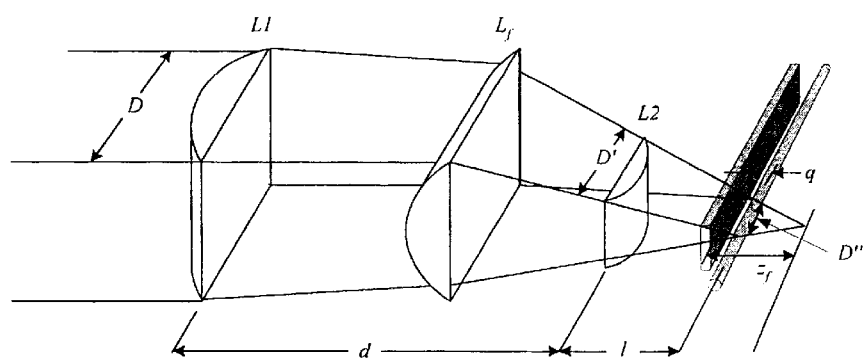
FIG. 4B is a perspective side view of a portion of the apparatus of FIG. 4A.

Now referring to FIGS. 4A and 4B, there is show an apparatus 10 for recording on optical grating along a waveguiding axis 12 of a photosensitive medium 14, according to a preferred embodiment of the invention.

The apparatus first includes a phase mask 16 provided proximate the photosensitive medium 14 along the waveguiding axis 12. A light source 18, preferably a UV laser source, is also provided and generates a light beam 20 which is directed to project through a portion of the phase mask 16. This in turn generates a light beam with a modulated intensity profile which impinges on the photosensitive medium 14 to locally record therein a portion of the optical grating having a characteristic period.

Means for moving the light beam 20 along the waveguiding axis 12 of the photosensitive medium 14, to successively record portions of the optical grating therealong, are further provided. In the present embodiment, these moving means include a 45° mirror 22 disposed to redirect the light beam 20 from the light source 18 towards the phase mask 16, this mirror being mounted on a translation stage 24.

Similarly, means for moving the phase mask 16 in a direction parallel to the moving of the light beam 20 and concurrently thereto are provided. Preferably, this is embodied by a second translation stage 26 on which the phase mask 16 is mounted. The relative movements of the phase mask 16 and the light beam 20 are adjusted to locally tune the characteristic period of each portion of the optical grating, in accordance with the technique described above.

Appropriate optical components are further provided to give the light beam 20 a wavefront curvature along the direction of the waveguiding axis. The wavefront radius of curvature, in the plane of the phase mask, is selected to generally optimize the efficiency of the recording of the optical grating, as also explained above.

In the illustrated embodiment, the light beam 20 is modified previously to impinging on the phase mask 16 by an optical system composed of lenses L1, L2 and Lf. Lens $L_f$ focuses the light beam 20 along the waveguiding axis of the photosensitive medium and therefore does not influence the wavefront curvature of the beam in this axis. Lenses L1 and L2 decrease the width of the light beam 20 and allow, via a longitudinal displacement of lens L1, an adjustment of the wavefront curvature. Distance q is the one between the phase mask and the waveguiding axis, l is the distance between lens L2 and the waveguiding axis, D, D' and D" are respectively the beam widths at the system input, at lens L2 and at the waveguiding axis, and $f_1$ and $f_2$ are the focal lengths of lenses L1 and L2 respectively. Distance d between lenses L1 and L2 has a nominal value, before adjustment of the wavefront radius of curvature, $f_1+f_2$; with this choice, the light beam 20 incident on the phase mask 16 is collimated and the period of the grating corresponds to the nominal period $p_0$, it is convenient to write d as:

$$d = f_1 + f_2 - \epsilon \quad (11)$$

so that $\epsilon$ varies around 0 for adjusting the local characteristic period of the grating. Using this setup, the relationship between the desired change of the characteristic period $\Delta p$ and the required position $\epsilon$ of lens L1 can be written as:

$$\frac{\Delta p}{p_0} = \frac{q\varepsilon}{f_2^2 + \varepsilon(l - f_2)} \quad (12)$$

The light beam width at lens L2 and at the waveguiding axis is respectively given by:

$$D' = D\left(\frac{f_2 - \varepsilon}{f_1}\right) \quad (13)$$

$$D'' = D\left(\frac{f_2}{f_1} - \frac{\varepsilon}{f_1}\left(1 - \frac{1}{f_2}\right)\right) \quad (14)$$

It is convenient to chose $l=f_2$. Then, the light beam width at the waveguiding axis is independent of the wavefront curvature and the grating period depends linearly on the position of lens L1, which is therefore preferably mounted on another translation stage 28.

In accordance with another particularly advantageous embodiment of the present invention, there is provided a method for recording an optical grating having a plurality of superimposed grating components each having a different characteristic period profile in a photosensitive medium. Such a superimposed grating is for example useful for compensation of chromatic dispersion as for disclosed in assignee's simultaneously filed co-pending application entitled "OPTICAL STRUCTURE FOR THE COMPENSATION OF CHROMATIC DISPERSION IN A LIGHT SIGNAL". The method according to this embodiment includes as before a first step of providing a phase mask proximate the photosensitive medium along the waveguiding axis. Then, for each of the superimposed grating components, the steps of the method described above are performed, that is:

i) projecting a light beam through a portion of the phase mask to generate a light beam with a modulated intensity profile, the light beam with a modulated intensity profile impinging on the photosensitive medium to locally record therein a portion of the optical grating component having a characteristic period;

ii) moving the light beam along the waveguiding axis of the photosensitive medium to successively record portions of the optical grating component therealong; and iii) concurrently to the moving of the light beam:
1) moving the phase mask in a direction parallel to the moving of the light beam, this moving of the phase mask being adjusted relative to the moving of the light beam to locally tune the characteristic period of each portion of the optical grating component; and
2) providing a curvature in the light beam along the direction of the waveguiding axis, the wavefront radius of curvature in the plane of the phase mask being selected to generally optimize the efficiency of the recording of the optical grating for said characteristic period.

Alternatively, the photosensitive medium is translated instead of the phase mask. It is understood that all of the above described variants of the method according to the previous embodiments may be equally applied to the current embodiment.

Figure 5A:
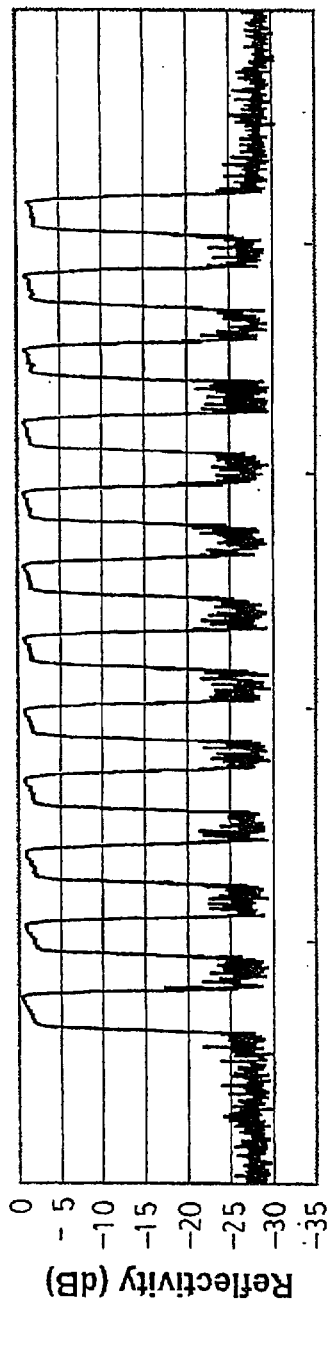
FIGS. 5A, 5B and 5C are graphs respectively showing the reflectivity the group delay and the dispersion of superimposed gratings fabricated using a preferred embodiment of the invention.
Figure 5B:
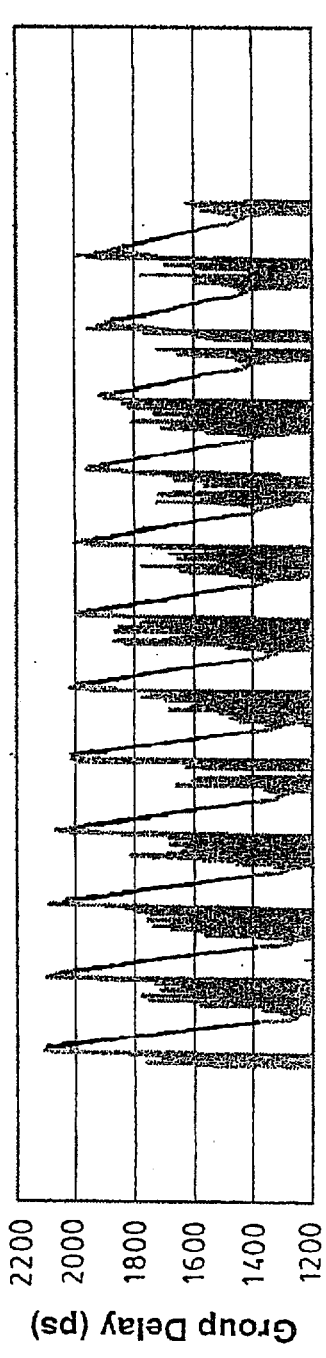
Figure 5C:
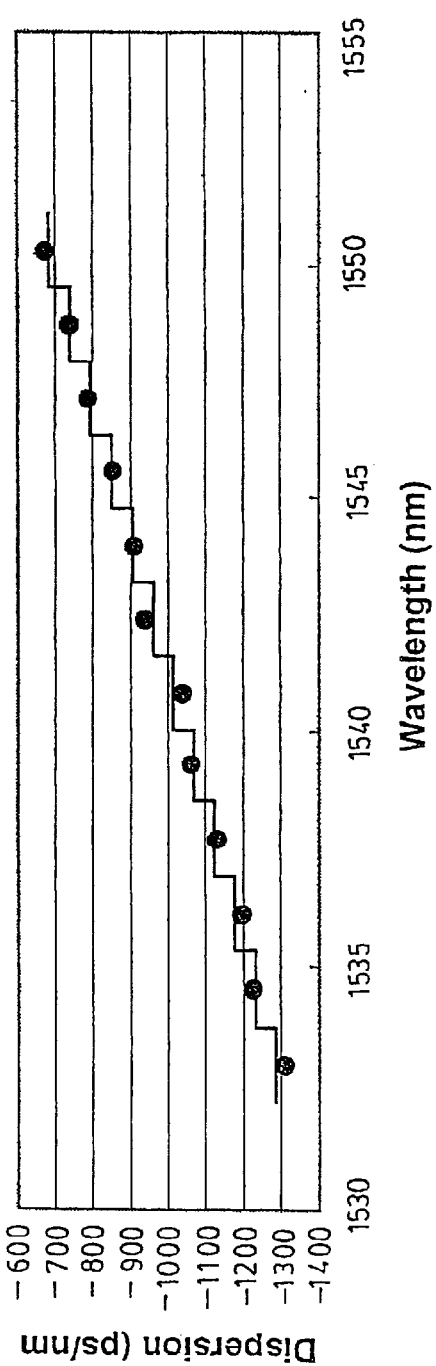

FIGS. 5A and 5B show the measurements of the reflectivity and group delay obtained for a multi-channel fiber Bragg grating made of superimposed grating components using the method of the present invention and the apparatus of FIG. 4A. For each of the channels, the central wavelength and the dispersion of the grating are adjusted by a proper control of the position of lens L1 and the phase mask displacement. FIG. 5C shows the dispersion measured en each channel in comparison with the targeted values. It is clear from this example that the present invention allows a precise and broad adjustment of both the Bragg wavelength and the chirp of the grating.

In summary, the present invention advantageously allows the adjustment of the Bragg wavelength over a large range, while avoiding slanted fringes inside the grating. Some of the advantages of the invention as described in the embodiments above are:

- a smaller number of phase masks is required for fabricating any grating within a specified period range. Phase masks are typically expensive;
- Mass production is easier because of less frequent phase mask changes;
- It is made practical to make superimposed gratings having different Bragg wavelengths. This operation was previously made possible by stretching of the fiber, but this technique is applicable over a more limited wavelength range.

Of course, numerous modifications could be made to the embodiments described above without departing from the scope of the invention as defined in the appended claims.

What is claimed is:

1. A method for recording an optical grating along a waveguiding axis in a photosensitive medium, the method comprising:

a) providing a phase mask proximate the photosensitive medium along the waveguiding axis;

b) projecting a light beam through a portion of said phase mask to generate a light beam with a modulated intensity profile, said light beam with a modulated intensity profile impinging on the photosensitive medium to locally record therein a portion of the optical grating having a characteristic period;

c) moving the light beam along the waveguiding axis of the photosensitive medium to successively record portions of the optical grating therealong; and d) concurrently to said moving of the light beam:
i) moving the phase mask in a direction parallel to the moving of the light beam, said moving of the phase mask being adjusted relative to the moving of the light beam to locally tune the characteristic period of each portion of the optical grating; and
ii) providing a curvature in said light beam along the direction of the waveguiding axis, said curvature having a wavefront radius of curvature at a phase mask plane selected to generally optimize an efficiency of the recording of the optical grating for said characteristic period.

2. The method according to claim 1, wherein the moving of the light beam and the moving of the phase mask are done step by step.

3. The method according to claim 2, wherein for each step of the moving, the light beam undergoes a displacement $\Delta z$ and the phase mask undergoes a displacement $\Delta x_m$, and the local tuning of the characteristic period $\Delta p$ with regards to a nominal value $p_0(z)$ is given by:

$$\frac{\Delta p}{p_0} = \frac{\Delta x_m}{\Delta z - \Delta x_m}.$$

4. The method according to claim 3, wherein the wavefront radius of curvature $z_f$ of the light beam at the phase mask plane, for a given step, adjusted so that:

$$z_f \approx q \cdot \frac{\Delta x_m - \Delta z}{\Delta x_m},$$

where q is the distance between the phase mask and the photosensitive medium waveguiding axis.

5. The method according to claim 1, wherein the moving of the light beam and the moving of the phase mask are done continuously.

6. The method according to claim 5, wherein the light beam light beam is moved at a velocity $v(z)$ and the phase mask is moved at a velocity $v_m(z)$, and the tuning of the characteristic period with regards to a nominal value $p_0(z)$ is given by:

$$\frac{\Delta p(z)}{p_0(z)} = \frac{v_m(z)}{v(z) - v_m(z)}.$$

7. The method according to claim 6, wherein the wavefront radius of curvature $z_f$ of the light beam at the phase mask plane is adjusted so that:

$$z_f \approx q \cdot \frac{v_m(z) - v(z)}{v_m(z)},$$

where q is the distance between the phase mask and the photosensitive medium waveguiding axis.

8. A method for recording an optical grating along a waveguiding axis in a photosensitive medium, the method comprising:
   a) providing a phase mask proximate to the photosensitive medium along the waveguiding axis;
   b) projecting a light beam through a portion of said phase mask to generate a light beam with a modulated intensity profile, said light beam with a modulated intensity profile impinging on the photosensitive medium to locally record therein a portion of the optical grating having a characteristic period;
   c) moving the light beam along the waveguiding axis of the photosensitive medium to successively record portions of the optical grating therealong; and
   d) concurrently to said moving of the light beam:
      i) moving the photosensitive medium in a direction parallel to the moving of the light beam, said moving of the photosensitive being adjusted relative to the moving of the light beam to locally tune the characteristic period of each portion of the optical grating; and
      ii) providing a curvature in said light beam along the direction of the waveguiding axis, said curvature having a wavefront radius of curvature in a plane of the phase mask selected to generally optimize an efficiency of the recording of the optical grating for said characteristic period.

9. The method according to claim 8, wherein the moving of the light beam and the moving of the photosensitive medium are done step by step.

10. The method according to claim 9, wherein for each step of the moving, the light beam undergoes a displacement $\Delta z$ and the phase mask undergoes a displacement $\Delta x_m$, and the local tuning of the characteristic period $\Delta p$ with regards to a nominal value $p_0(z)$ is given by:

$$\frac{\Delta p}{p_0} = \frac{\Delta x_m}{\Delta z - \Delta x_m}.$$

11. The method according to claim 10, wherein the wavefront radius of curvature $z_f$ of the light beam at the phase mask plane, for a given step, adjusted so that:

$$z_f \approx q \cdot \frac{\Delta x_m - \Delta z}{\Delta x_m},$$

where q is the distance between the phase mask and the photosensitive medium waveguiding axis.

12. The method according to claim 8, wherein the moving of the light beam and the moving of the photosensitive medium are done continuously.

13. The method according to claim 12, wherein the light beam is moved at a velocity $v(z)$ and the photosensitive medium is moved at a velocity $v_m(z)$, and the local tuning of the characteristic period with regards to a nominal value $p_0(z)$ is given by:

$$\frac{\Delta p(z)}{p_0(z)} = \frac{v_m(z)}{v(z) - v_m(z)}.$$

14. The method according to claim 13, wherein the wavefront radius of curvature $z_f$ of the light beam at the phase mask plane, is generally determined by the relation:

$$z_f \approx q \cdot \frac{v_m(z) - v(z)}{v_m(z)},$$

where q is the distance between the phase mask and the photosensitive medium waveguiding axis.

15. An apparatus for recording an optical grating along a waveguiding axis in a photosensitive medium, the apparatus comprising:
   a phase mask provided proximate the photosensitive medium along the waveguiding axis;
   a light source generating a light beam for projection through a portion of said phase mask to generate a light beam with a modulated intensity profile, said light beam with a modulated intensity profile impinging on the photosensitive medium to locally record therein a portion of the optical grating having a characteristic period;
   light beam moving means for moving the light beam along the waveguiding axis of the photosensitive medium to successively record portions of the optical grating therealong;
   phase mask moving means for moving the phase mask in a direction parallel to the moving of the light beam and concurrently thereto, said moving of the phase mask being adjusted relative to the moving of the light beam to locally tune the characteristic period of each portion of the optical grating; and curvature means for providing a curvature in the light beam along the direction of the waveguiding axis, said curvature having a wavefront radius of curvature in a plane of the phase mask selected to generally optimize an efficiency of the recording of the optical grating for said characteristic period of each portion of the optical grating.

16. An apparatus according to claim 15, wherein the light source comprises a UV laser source generating the light beam and collimating means collimating said light beam.

17. An apparatus according to claim 16, wherein the curvature means comprise an optical assembly disposed between the UV laser source and the phase mask.

18. An apparatus according to claim 17, wherein said optical assembly comprises a first an a second opposed lens displaceable along an axis of the light beam.

19. An apparatus according to claim 15, wherein said light beam moving means comprise a translation stage on which a 45° mirror and said curvature means are mounted, said 45° mirror being used for directing the light beam towards the phase mask.

20. An apparatus according to claim 15, wherein the phase mask moving means comprise a translation stage on which the phase mask is mounted.

21. A method for recording an optical grating along a waveguiding axis in a photosensitive medium, the optical grating comprising a plurality of superimposed grating components each having a characteristic period profile, the method comprising:

a) providing a phase mask proximate the photosensitive medium along the waveguiding axis;

b) for each of the superimposed grating component: projecting a light beam through a portion of said phase mask to generate a light beam with a modulated intensity profile, said light beam with a modulated intensity profile impinging on the photosensitive medium to locally record therein a portion of the optical grating component having a characteristic period;

i) moving the light beam along the waveguiding axis of the photosensitive medium to successively record portions of the optical grating component therealong; and ii) concurrently to said moving of the light beam:

1) moving the phase mask in a direction parallel to the moving of the light beam, said moving of the phase mask being adjusted relative to the moving of the light beam to locally tune the characteristic period of each portion of the optical grating component; and 2) providing a curvature in said light beam along the direction of the waveguiding axis, said curvature having a wavefront radius of curvature in a plane of the phase mask selected to generally optimize an efficiency of the recording of the optical grating for said characteristic period.

22. The method according to claim 21, wherein the moving of the light beam and the moving of the phase mask are done step by step.

23. The method according to claim 22, wherein for each step of the moving, the light beam undergoes a displacement $\Delta z$ and the phase mask undergoes a displacement $\Delta x_m$, and the local tuning of the characteristic period with regards to a nominal value $p_0(z)$ is given by:

$$\frac{\Delta p(z)}{p_0(z)} = \frac{\Delta x_m(z)}{\Delta z - \Delta x_m(z)}.$$

24. The method according to claim 23, wherein the wavefront radius of curvature $z_f$ of the light beam at the phase mask plane, for a given step, adjusted so that:

$$z_f \approx q \cdot \frac{\Delta x_m(z) - \Delta z}{\Delta x_m(z)},$$

where q is the distance between the phase mask and the photosensitive medium waveguiding axis.

25. The method according to claim 21, wherein the moving of the light beam and the moving of the phase mask are done continuously.

26. The method according to claim 25, wherein the light beam light beam is moved is at a velocity $v(z)$ and the phase mask is moved at a velocity $v_m(z)$, and the tuning of the characteristic period with regards to a nominal value $p_0(z)$ is given by:

$$\frac{\Delta p(z)}{p_0(z)} = \frac{v_m(z)}{v(z) - v_m(z)}.$$

27. The method according to claim 26, wherein the wavefront radius of curvature $z_f$ of the light beam at the phase mask plane is adjusted so that:

$$z_f \approx q \cdot \frac{v_m(z) - v(z)}{v_m(z)},$$

where q is the distance between the phase mask and the photosensitive medium waveguiding axis.

* * * * *